A. DOBLE.
FUEL AND WATER REGULATOR FOR BOILERS.
APPLICATION FILED MAR. 27, 1913.
1,067,101. Patented July 8, 1913.
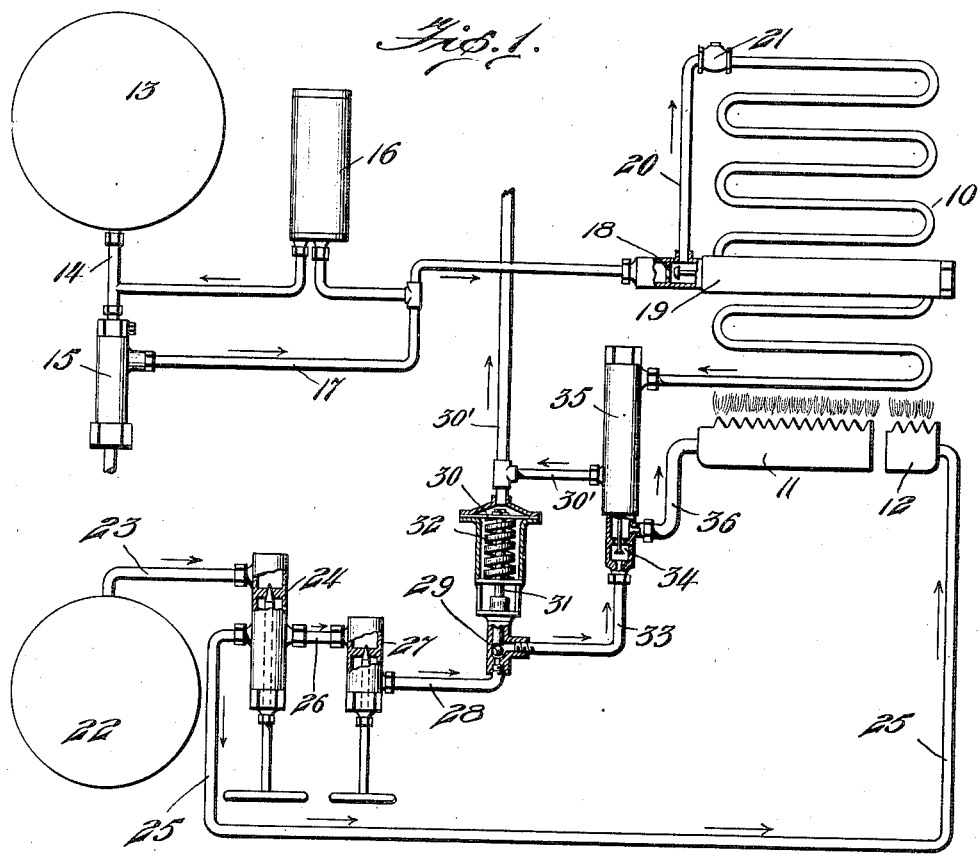
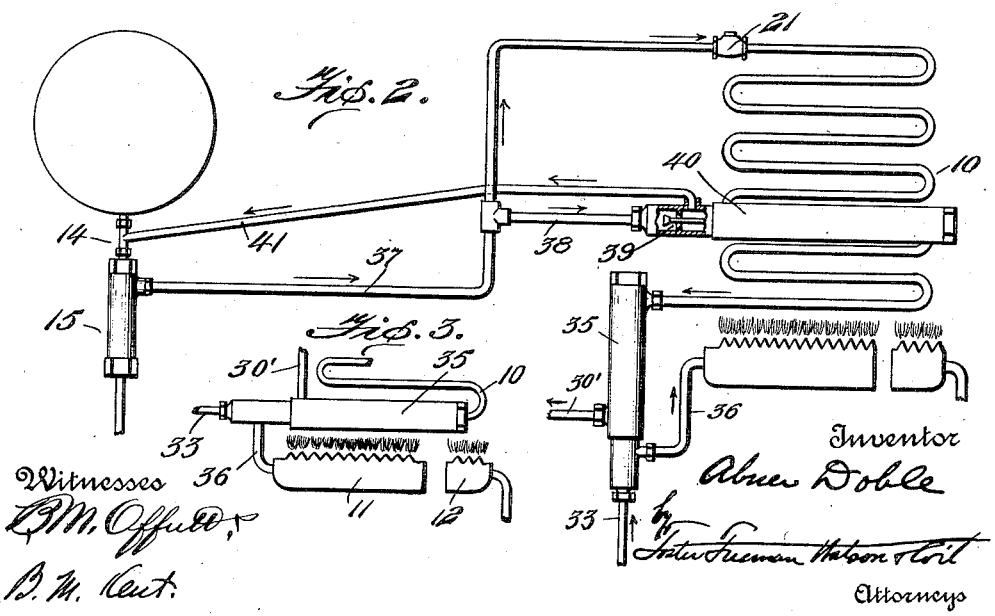
Inventor
Abner Doble

UNITED STATES PATENT OFFICE.

ABNER DOBLE, OF WALTHAM, MASSACHUSETTS.

FUEL AND WATER REGULATOR FOR BOILERS.

1,067,101.

Specification of Letters Patent.

Patented July 8, 1913.

Application filed March 27, 1913. Serial No. 757,180.

*To all whom it may concern:*

Be it known that I, ABNER DOBLE, a citizen of the United States, and resident of Waltham, county of Middlesex, State of Massachusetts, have invented a new and useful Improvement in Fuel and Water Regulators for Boilers, of which the following is a specification.

This invention relates to fuel and water regulating systems for boilers and more particularly to systems of this character adapted to be used in connection with steam motor vehicles.

Some of the objects of the invention are to provide a system which is extremely simple as to the number of parts and manner of their adjustment, which will be highly efficient and absolutely reliable under practically all conditions of operation, and which may be used in conjunction with a boiler of the semi-flash type and when so used, provide a system of steam generation which is capable of "steaming up" with the usual celerity of flash boilers and at the same time have the "reserve power" and "steady steaming" qualities of the well known fire tube boiler.

Other objects are to provide a system in which the regulating devices are entirely independent in their operation and may be set, at the factory, to operate under predetermined conditions, and when so set will operate indefinitely without requiring adjustment.

The features of novelty of the invention will be apparent from the following description taken in connection with the accompanying drawings, in which, Figure 1 is a diagrammatic view of a system embodying my invention; Fig. 2 is a diagrammatic view of a portion of another system showing a modification of my invention; Fig. 3 is a fragmentary view of a further modification.

Referring to the drawings, 10 indicates a boiler, preferably of the coil type, 11 the main burner, and 12 the pilot burner. A water supply reservoir 13 is provided with an outlet pipe 14 which connects with the suction side of a pump 15, this pump being preferably driven by the engine or running gear of the vehicle so as to operate in accordance with the speed of the vehicle. A water pressure regulator 16 of any suitable type but preferably of the type shown in my Patent No. 1,030,983, granted July 2, 1912, is arranged in a by-pass which connects the discharge pipe 17 of the pump 15 with the suction pipe 14 thereof. This water pressure regulator operates in substantially the same manner as the regulator 24 in my aforesaid prior patent and is adapted to maintain the pressure in the pipe 17 at an amount preferably about fifty pounds per square inch in excess of the normal boiler pressure. The pump 15 is preferably of sufficient capacity to deliver water at all times in excess of the boiler requirements and the regulator 16 by-passes the amount in excess of the boiler requirements, to the suction side of the pump. The pipe 17 leads to the thermostatically operated valve 18, the thermostat 19 which operates this valve being of any suitable construction, for example such as that indicated at 16 in my aforesaid prior patent. From the valve 18, the water is conducted through a pipe 20 and a check valve 21 to the boiler 10.

A boiler of the semi-flash type, such as is indicated in the drawings, comprises zones in which the water is gradually heated and converted into steam and the steam superheated prior to passing out the delivery end of the boiler. In order to have the thermostat 19 so positioned as to be most responsive to changes in the conditions within the boiler, I prefer to arrange the thermostat in the saturated steam zone of the boiler which is ordinarily about two-thirds of the distance between the ends of the boiler. It is well known that thermostats are more responsive to changes in temperature in saturated steam than to changes in temperature of superheated steam owing to the relatively greater conductivity of the former and therefore by having the thermostat 19 located in the saturated steam zone of the boiler it will be in a position to be most responsive to changes in conditions within the boiler.

As shown in Fig. 1, the valve 18 is arranged to be closed whenever the temperature in the saturated steam zone of the boiler is below that corresponding to the normal boiler pressure so that when the temperature is below this predetermined amount no water will flow to the boiler and as a consequence all of the heat developed by the burner 11 will be used in heating the water and steam then in the boiler and under these conditions the temperature will be quickly raised to that corresponding to the normal boiler pressure. When the temperature reaches that corresponding to the normal boiler pressure the valve 18 is opened by the thermostat 19 and as the temperature rises above this predetermined amount the valve 18 is opened wider in order to increase the flow of water to the boiler in proportion to the excess of the temperature of the steam above the aforesaid predetermined temperature.

A fuel tank 22 is provided and pressure is maintained in this tank for the purpose of causing the fuel which will ordinarily be in liquid form, to be discharged through the pipe 23 to the cut-off valve 24. A portion of the fuel after passing through the valve 24 will be conducted by means of the pipe 25 to the pilot burner 12 and the balance of the fuel will be conducted by means of a pipe 26 to the stop valve 27 and from the latter by means of a pipe 28 to a valve 29. The valve 29 is of the pressure actuated type and in the form shown in Fig. 1 a diaphragm 30 is subjected to the boiler pressure by means of a pipe 30', which also conducts steam to the engine of the vehicle, and the stem 31 of the valve is connected with this diaphragm so as to open and close the valve 29 in accordance with the movements of the diaphragm. The pressure on the diaphragm 30 is opposed by a heavy spring 32, this spring opening the valve 29 when the boiler pressure is below a predetermined amount, preferably the normal pressure. From the valve 29 the fuel is conducted by a pipe 33 through a valve 34, which is operated by a thermostat 35, the latter being preferably similar to the thermostat 19. After passing the valve 34, the fuel is conveyed to the burner 11 by means of the pipe 36.

The thermostat 35 may be arranged as shown in Fig. 1, so as to be subjected to the temperature of the steam immediately after it leaves the boiler or it may be arranged as shown in Fig. 3, wherein it is directly above the burner 11 and subjected to the maximum heat of the boiler. When the thermostat is in the position shown in Fig. 3, it will not only be subject to the temperature of the steam leaving the boiler, but will also be in a position where it will close the valve 34 and cut off the supply of fuel to the main burner whenever the temperature of the thermostat exceeds a predetermined amount. In the normal operation of the boiler the valve 34 does not regulate the flow of fuel to the burner 11 because this valve and the thermostat 35 are so adjusted that the valve 34 is closed only on the attainment of an excessive or dangerous temperature. Under these conditions it is obvious that if the burner 11 is in operation and there is no water in the boiler, the valve 34 will be closed as soon as the temperature in the thermostat 35 reaches this predetermined or dangerous degree and therefore the thermostat and valve 34 operate as a safety device to prevent burning out the boiler. The supply of fuel to the main burner 11 is normally under the sole control of the pressure actuated valve 29, it being understood that the valves 24 and 27 are normally open a sufficient amount to permit the supply of fuel to the main burner to be wholly under control of the valve 29.

From the foregoing it will be seen that the regulation of the water and fuel supplied to the boiler is accomplished entirely by the valves 18 and 29 and since under all running conditions of the vehicle the pump 15 supplies water in excess of the boiler requirements it is obvious that the boiler can, under no circumstances, be "flooded" because the valve 18 is always closed except when the temperature of the steam passing through the thermostat 19 is at or above that corresponding to the normal boiler pressure. Furthermore, the burner 11 is supplied with the maximum amount of fuel under all conditions except when the boiler pressure exceeds the predetermined normal and therefore when the vehicle is driven up a long hill or subjected to a heavy load for a considerable period of time the engine will be supplied at all times with the maximum proportion of the heat capable of being developed by the burner 11 under all conditions below normal boiler pressure and temperature.

In the form of the invention shown in Fig. 2, I have dispensed with the pressure regulator 16 and deliver water directly to the boiler by means of a pipe 37. Connected with the pipe 37 is a branch 38 leading to the valve 39, this valve being actuated by a thermostat 40 which is similar to the thermostats 19 and 35. Water which passes through the valve 39 is returned to the suction side of the pump 15 by means of a pipe 41. The valve 39 is normally open so that no water will be delivered to the boiler except when the temperature of the steam in the saturated steam zone is below that corresponding to the normal boiler pressure. When the temperature of the steam reaches that corresponding to the normal boiler pressure or exceeds the same, the valve 39 is closed and thus compels the water which is delivered by the pump 15 to flow to the boiler. Otherwise this system is similar to that shown in Fig. 1.

The systems shown in Figs. 1 and 2, while materially different as to the water regulating devices, are similar in that water does not flow to the boiler when the temperature of the steam in the saturated steam zone of the boiler is below that corresponding to the normal boiler pressure, and is compelled to flow to the boiler when this temperature equals or exceeds the predetermined temperature.

Having described my invention what I claim and desire to secure by Letters-Patent is, 1. In a fuel and water regulator for boilers, the combination of a water supply reservoir, a pump adapted to draw water from said reservoir and deliver the water to the boiler at rates in excess of the boiler requirements, a by-passing device for normally maintaining the water on the delivery side of the pump at a pressure in excess of the normal boiler pressure and deliver the excess of water over the boiler requirements, to the suction side of said pump, a thermostatically operated valve in the water supply line for the boiler adapted to be shut when the temperature of the steam is below a predetermined degree, whereby no water will be supplied to the boiler, and to permit water to flow to the boiler at rates variable with the excess in the temperature of the steam above said predetermined degree, a thermostatically operated valve adapted to reduce the supply of fuel to the boiler when the temperature of the steam delivered exceeds a predetermined degree, and a pressure actuated valve adapted to reduce the supply of fuel to the boiler when the boiler pressure exceeds a predetermined amount, all of said valves being independent in their operation.

2. In a fuel and water regulator for boilers, the combination of a water supply reservoir, a pump adapted to draw water from said reservoir and deliver the water to the boiler at rates in excess of the boiler requirements, a by-passing device for normally maintaining the water on the delivery side of the pump at a pressure in excess of the normal boiler pressure and deliver the excess of water over the boiler requirements, to the suction side of said pump, a thermostatically operated valve in the water supply line for the boiler adapted to be shut when the temperature of the steam is below a predetermined degree, whereby no water will be supplied to the boiler, and to permit water to flow to the boiler at rates variable with the excess in the temperature of the steam above said predetermined degree, and a pressure actuated valve adapted to reduce the supply of fuel to the boiler when the boiler pressure exceeds a predetermined amount, said valves being independent in their operation.

3. In combination with a boiler of the semi-flash type in which the water flows through the various zones of the boiler in succession and wherein it is heated progressively, of means for supplying water to the boiler, means for supplying fuel, a valve in the water supply means thermostatically operated to control the flow of water to the boiler in accordance with temperature in the saturated steam zone of the boiler, and a valve in the fuel supply means thermostatically operated to reduce the supply of fuel to the boiler in accordance with temperature at the delivery end of the superheated steam zone of the boiler.

4. In combination with a boiler of the semi-flash type in which the water flows through the various zones of the boiler in succession and wherein it is heated progressively, of means for supplying water to the boiler, means for supplying fuel, a valve in the water supply means thermostatically operated to control the flow of water to the boiler in accordance with temperature in the saturated steam zone of the boiler, a valve in the fuel supply means thermostatically operated to reduce the supply of fuel to the boiler in accordance with the excess of the temperature, at the delivery end of the superheated steam zone of the boiler, above a predetermined degree, and a pressure actuated valve adapted to reduce the supply of fuel to the boiler in accordance with the excess of the boiler pressure above a predetermined pressure.

5. In combination with a boiler of the semi-flash type in which the water flows through the various zones of the boiler in succession and wherein it is heated progressively, of means for supplying water to the boiler, means for supplying fuel, a valve in the water supply means thermostatically operated to control the flow of water to the boiler in accordance with temperature in the saturated steam zone of the boiler, and a pressure actuated valve adapted to reduce the supply of fuel to the boiler in accordance with the excess of the boiler pressure above a predetermined pressure.

In testimony whereof I affix my signature in presence of two witnesses.

ABNER DOBLE.

Witnesses:
S. C. MUSSEY,
JOHN W. ALLEN.